(12) United States Patent
Stumbeck et al.

(10) Patent No.: US 8,480,845 B2
(45) Date of Patent: Jul. 9, 2013

(54) THERMOSETTING SOLVENT-FREE SINGLE-COMPONENT COMPOSITIONS AND THEIR USE

(75) Inventors: Michael Stumbeck, Rosenheim (DE); Juergen Koebler, Gilching (DE)

(73) Assignee: Delo Industrieklebstoffe GmbH & Co. KG (DE)

( * ) Notice: Subject to any disclaimer, the term of this patent is extended or adjusted under 35 U.S.C. 154(b) by 905 days.

(21) Appl. No.: 11/994,113

(22) PCT Filed: Jul. 3, 2006

(86) PCT No.: PCT/EP2006/006447
§ 371 (c)(1),
(2), (4) Date: Dec. 27, 2007

(87) PCT Pub. No.: WO2007/003392
PCT Pub. Date: Jan. 11, 2007

(65) Prior Publication Data
US 2010/0212830 A1    Aug. 26, 2010

(30) Foreign Application Priority Data
Jul. 5, 2005   (DE) .......................... 10 2005 031 381

(51) Int. Cl.
C09J 163/00    (2006.01)
B05D 3/02    (2006.01)
C08G 18/08    (2006.01)

(52) U.S. Cl.
USPC ............................. 156/330; 427/386; 524/589

(58) Field of Classification Search
USPC ............................. 156/330; 427/386; 524/589
See application file for complete search history.

(56) References Cited

U.S. PATENT DOCUMENTS

| 3,375,299 | A |   | 3/1968  | Levine et al. ................. 260/830 |
| 3,426,097 | A |   | 2/1969  | Iikka et al. .................... 260/830 |
| 4,595,445 | A |   | 6/1986  | Hombach et al. .......... 156/307.3 |
| 4,737,565 | A | * | 4/1988  | Goel .............................. 528/73 |
| 4,778,845 | A |   | 10/1988 | Tschan et al. ................. 524/710 |
| 4,897,430 | A |   | 1/1990  | Speranza et al. ............... 521/159 |
| 4,912,152 | A | * | 3/1990  | Nejigaki et al. ............... 524/729 |
| 5,077,376 | A | * | 12/1991 | Dooley ......................... 528/113 |
| 5,235,062 | A |   | 8/1993  | Greco et al. ................... 548/215 |
| 5,387,656 | A | * | 2/1995  | Zupancic et al. .............. 525/523 |
| 5,747,581 | A |   | 5/1998  | Proebster et al. ............. 524/590 |
| 6,001,204 | A |   | 12/1999 | Halg et al. ..................... 156/108 |
| 6,670,445 | B2 | * | 12/2003 | Okuhira ......................... 528/481 |
| 2003/0221770 | A1 | * | 12/2003 | Meixner et al. ................ 156/230 |
| 2004/0147711 | A1 | * | 7/2004  | Christiansen et al. .......... 528/91 |

FOREIGN PATENT DOCUMENTS

| EP | 0 205 846 | 12/1986 |
| EP | 0 255 572 | 2/1988 |
| EP | 0 279 566 | 8/1988 |
| EP | 0 367 478 | 5/1990 |
| EP | 0 873 369 | 9/2002 |
| WO | WO 88/06165 | 8/1988 |
| WO | WO 02/33011 | 4/2002 |

OTHER PUBLICATIONS

Muller et al., "Formuliderung von Kleb—Dichtstoffen", Vincente-Verlag, Hanover, 2004.
German Search Report Application No. 10 2005 031 381.7, May 7, 2005.
PCT Search Report Application No. PCT/EP06/006447, dated Aug. 31, 2006.
EPO Communication dated Jan. 22, 2010.
Translation of Written Opinion, mailed Feb. 7, 2008.

* cited by examiner

*Primary Examiner* — Michael Orlando
(74) *Attorney, Agent, or Firm* — Hayes Soloway P.C.

(57) ABSTRACT

We propose a thermosetting solvent-free single-component composition having a storage stability at room temperature of at least 2 weeks, consisting of
  (A) 5-90 parts by weight of one at least difunctional (iso) cyanate component,
  (B) 5-50 parts by weight of a latent curing agent solid up to a temperature of at least 40° C. based on nitrogen compounds suitable for addition crosslinking,
  (C) 0-50 parts by weight of an epoxy-containing compound and
  (D) 0-50 parts by weight of modifiers,
with the sum of all parts by weight being 100, and its use for bonding, casting, sealing and coating of substrates, in particular electronic parts. The composition is cured at 120° C. to 150° C. within seconds.

23 Claims, 2 Drawing Sheets

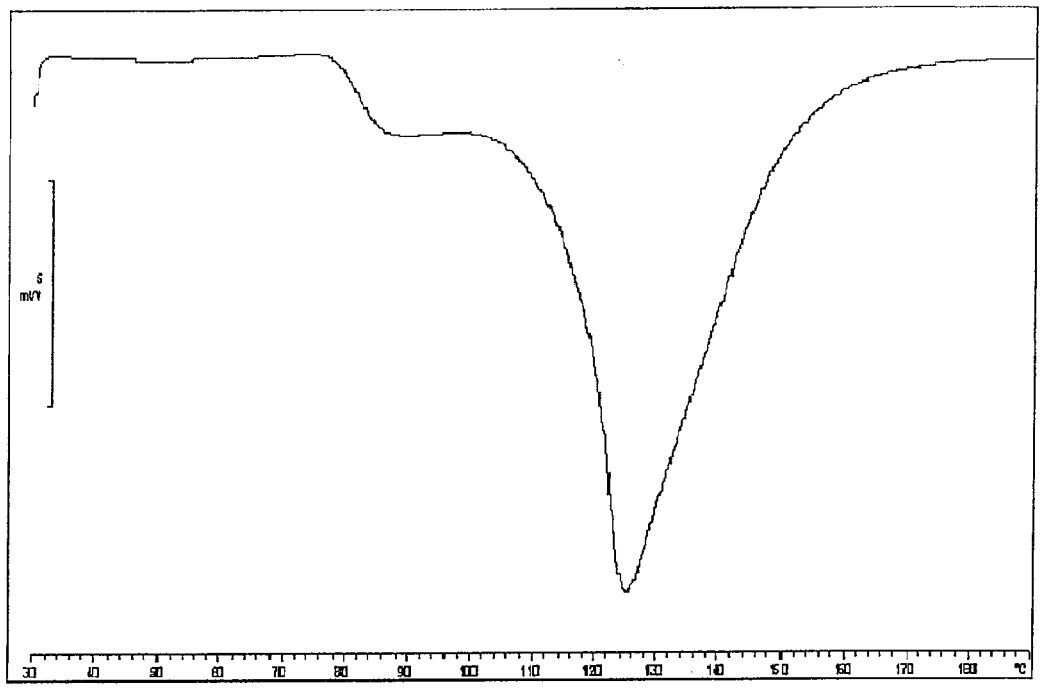
Fig. 1: DSC graph of example 1 (comparative example)
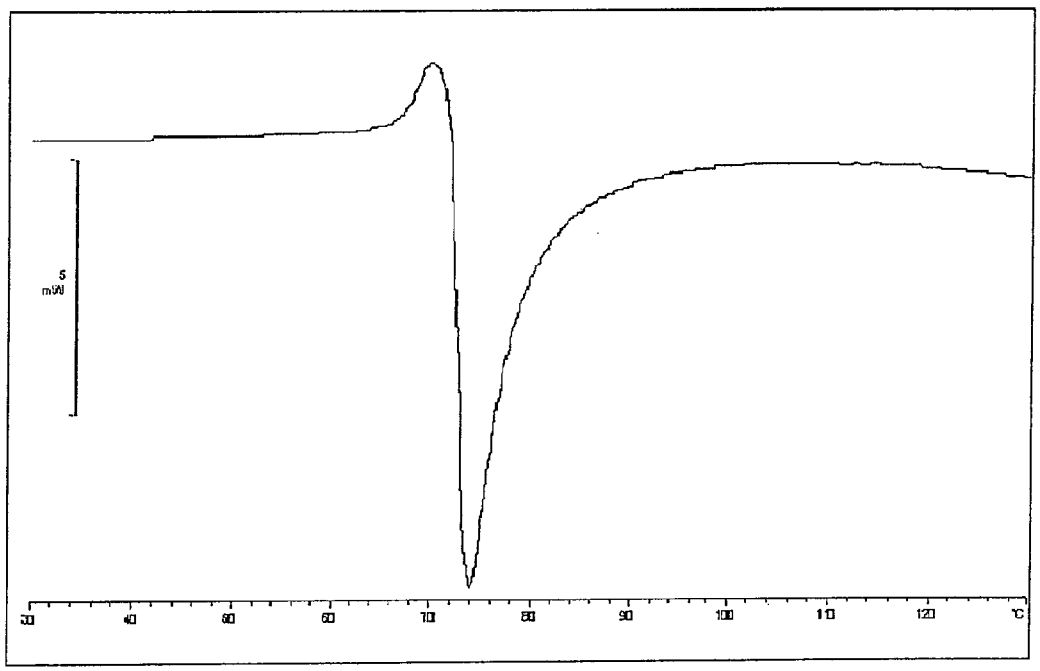
Fig. 2: DSC graph of example 2 (composition of the present invention)

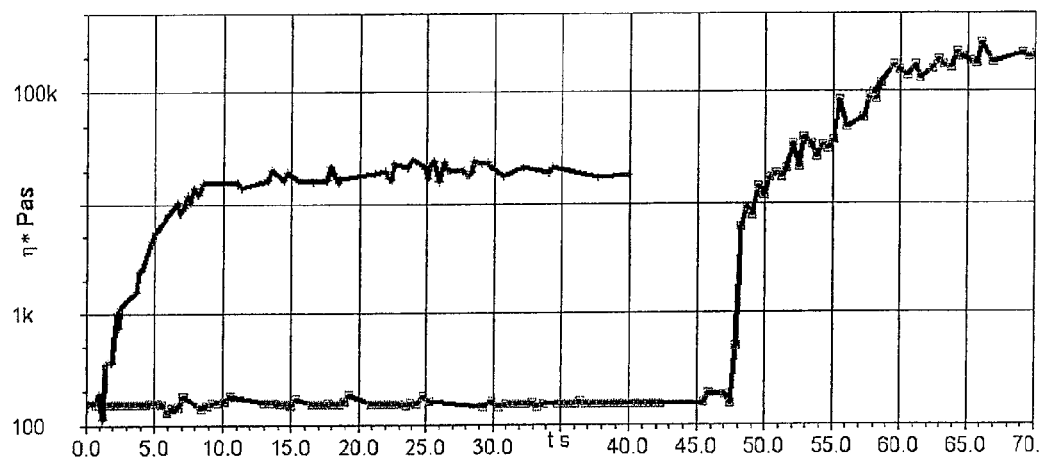
Fig. 3: Rheometer-measured curing, Comparison of example 1, right-hand graph (comparative example) and example 2, left-hand graph (composition of the present invention)

THERMOSETTING SOLVENT-FREE SINGLE-COMPONENT COMPOSITIONS AND THEIR USE

The present invention relates to thermosetting solvent-free single-component compositions based on (iso)cyanates and latent curing agents and to their use for bonding, casting, sealing and coating of substrates. Such compositions have widespread use and have been utilized as bonding and sealing compositions for construction purposes, as structural adhesives or as casting and coating compositions in the electronics industry.

Hereinafter the term "(iso)cyanates" means the group consisting of cyanates, isocyanates and mixtures of cyanates and isocyanates, with the spelling following the internationally conventional spelling of the group of (meth)acrylates.

In relation to the present invention, the term "latent curing agents" means curing agents that are solid under storage conditions up to a temperature of at least 40° C. and remain inactive during a certain period of time, but become active in a molten, liquid state at a temperature of from 80 to 160° C. typical for thermosetting, and cause a polyaddition and crosslinking reaction between the curing agent and the (iso)cyanate.

The book "Formulierung von Kleb-und Dichtstoffen" by B. Müller and W. Rath, published in 2004 by Vincentz-Verlag, Hanover, describes the prior art in detail. Accordingly, a person having ordinary skill in the art knows the following curing methods:

In the case of two-component polyurethane compositions, the first isocyanate-containing component is mixed with a second component and applied by the user. The second component usually comprises compounds containing hydroxy groups as a curing agent, often polyether polyols or polyester polyols. In general, amines alone are not used for two-component polyurethanes, since due to their high reaction speed a sensible use is no longer possible. For this reason, mixtures of amines and compounds containing hydroxy groups are often employed. However, two-component compositions are undesirable due to the mixing process required for many applications, in particular in the electronics field.

Single-component isocyanate compositions may be cured in the presence of water, e.g. in the form of atmospheric humidity. For this purpose, blocked amines may be used; by reacting the amine with ketones or aldehydes, ketimines or enamines are formed, which hydrolyze in the presence of moisture, causing a reaction between the amine released and the isocyanate. One major disadvantage is the release of aldehydes and ketones, which should be avoided for both the maintenance of industrial health and safety standards and environmental protection purposes.

It is also possible, by using moisture, to allow isocyanates to react with themselves. In this case, together with moisture, carbamic acid is formed, which decarboxylizes to form an amine with the elimination of carbon dioxide. Subsequently, this amine reacts with the isocyanate to form a polyurea. The released carbon dioxide causes a foaming of the compositions, which is welcome for insulating foams in the construction field, but unacceptable for e.g. adhesives.

General disadvantages of moisture curing processes are the relatively slow curing progress and the dependence on the extent of the atmospheric humidity.

Another way to cure single-component isocyanate compositions is the use of heat.

Amines blocked by sodium chloride are available from Crompton Chemical. These complexes, which are dispersed in dioctyl phthalate, decompose at temperatures of from 100° C. to 160° C. to form the amine and sodium chloride. Since one sodium chloride molecule is used for blocking one amine group each, the result—depending on the respective isocyanate—is a proportion of several percents of sodium chloride in the cured composition. Together with the dispersing agent, which simultaneously acts as a polymer plasticizer and, as sodium chloride, does not take part in the curing reaction, the proportion of unreacted components contained in the cured composition is very disadvantageous with regard to many properties such as adjusting hardness and moisture stability. Sodium chloride is particularly disadvantageous for electronics applications in which the proportion of hydrolyzable chloride should be below 100 ppm due to corrosion hazards.

Blocked isocyanates such as adducts of isocyanates with oximes, phenols, ε-caprolactam, diethyl malonate or 3,5-dimethyl pyrazole have been widely used for thermosetting compositions. Dimeric isocyanates (of the uretdione type) are also considered to belong to this group. Depending on the type of blocking agent, the deblocking temperatures range from 100° C. to 180° C., with the curing speed determined by the speed at which the blocking agent is separated. For example, 15 minutes at 150° C. is a common period for the curing of these compositions. However, these periods are much too extended for applications in which the speed is critical.

Thus, the disadvantages of the prior art isocyanate compositions may be summarized as follows: the known compositions are two-component or moisture-curing compositions or contain disturbing cleavage products with too slow a curing speed irrespective of the chosen curing method.

There already exist single-component epoxy resin compositions with latent curing agents that have found widespread use as adhesives or casting compositions in technology, in particular in the electronics industry. The latent curing agents used in these compositions consist of nitrogen-containing compounds such as dicyandiamide, aromatic amines or imidazoles, which are present in the adhesive in an undissolved state at room temperature, melting only at elevated temperatures to be available for the curing of the epoxy resins. Although these compositions are characterized by a very high storage stability, their curing time at temperatures of up to 150° C. is usually in the range of minutes.

It is one object of the invention to provide thermosetting solvent-free single-component compositions based on (iso)cyanates and latent curing agents and to propose methods for their use, which, despite their high storage stability, can be cured much faster that the known isocyanate compositions, thus presenting interesting alternatives to the prior art for many applications, in particular for applications in the electronics industry where large numbers of parts have to be bonded, cast or coated within a very short period of time.

According to the present invention this object is solved by thermosetting solvent-free single-component compositions having a storage stability at room temperature of at least 2 weeks, consisting of 5-90 parts by weight of one at least difunctional (iso)cyanate component selected from the group consisting of difunctional cyanates, difunctional isocyanates and mixtures thereof, 5-50 parts by weight of a latent curing agent being solid up to a temperature of at least 40° C. based on nitrogen compounds suitable for addition crosslinking, 0-50 parts by weight of an epoxy-containing compound, 0-50 parts by weight of modifiers selected from at least one of the groups of fillers, colorants, pigments, stabilizing agents, moisture-binding agents, accelerators, flow agents, wetting agents, thixotropifying agents, diluents and polymeric thickening agents, with the sum of all parts by weight being 100.

The solvent-free compositions according to the present invention are present in the form of a single-component mixture with a high storage stability, which, for curing, requires no addition of a second component, but must be subjected to heating, which causes the latent curing agent solid up to a temperature of at least 40° C. to melt and subsequently react, in a molten phase, with the (iso)cyanate component by addition crosslinking.

Preferably, possible (iso)cyanates (component (A)) are compounds of the formulae $Q(OCN)_n$ and $Q(NCO)_n$, wherein independently n=2 to 5, preferably 2 or 3, and Q is an aliphatic hydrocarbon residue having 2 to 18, preferably 6 to 10 C atoms, a cycloaliphatic hydrocarbon residue having 4 to 15, preferably 5 to 10 C atoms or an aromatic hydrocarbon residue having 6 to 15, preferably 6 to 13 C atoms.

Exemplary polycyanates are 4,4'-ethylidene diphenyl dicyanate, also referred to as "bisphenol-E cyanate ester", bisphenol-A cyanate ester, hexafluoro-bisphenol-A cyanate ester, tetramethyl bisphenol-F cyanate ester, bisphenol-M cyanate ester, phenol novolak cyanate ester, bisphenol-C cyanate ester and dicyclopentadienylphenol cyanate ester. Oligomeric cyanate esters such as oligo-(3-methylene-1,5-phenylenecyanate) may also be used.

Exemplary polyisocyanates are hexamethylene diisocyanate, 1,12-didecane diisocyanate, cyclobutane-1,3-diisocyanate, cyclohexane-1,3- and -1,4-diisocyanate and any mixture of these isomers, 1-isocyanato-3,3,5-trimethyl-5-isocyanatomethylcyclohexane, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-toluylene diisocyanate and any mixture of these isomers, diphenylmethane-2,4'- and/or -4,4'-diisocyanate, naphthylene-1,5-diisocyanate, triphenylmethane-4,4',4"-triisocyanate or polyphenyl polymethylene polyisocyanates as obtained by aniline-formaldehyde condensation and subsequent phosgenation.

Suitable higher molecular polyisocyanates are modification products of such simple polyisocyanates, i.e. polyisocyanates with, for example, isocyanurate, carbodiimide, allophanate, biuret or uretdione structural units as may be produced according to methods per se known in the prior art from the exemplary simple polyisocyanates of the above-mentioned general formula. Among the modified higher molecular polyisocyanates, the prepolymers having terminal isocyanate groups having a molecular weight ranging from 400 to 10,000, preferably 600 to 8.000 and most preferably 800 to 5,000 known from polyurethane chemistry are of particular interest. These compounds are formed in a manner known per se by reacting excess amounts of simple polyisocyanates of the exemplary types mentioned above with organic compounds having at least two groups that may react with isocyanate groups, in particular organic polyhydroxyl compounds. Blocked isocyanates may also be used, provided that the protective group is separated at the curing temperatures used. Although this may extend the storage stability, curing times are increased.

By using isocyanates having additional reactive groups, e.g. acrylate groups, it is possible to introduce additional crosslinking in the form of an interpenetrating network. For example, a hard acrylate network may be combined with a flexible polyurea network.

Mixtures of isocyanates and cyanates may also be used in any mixing ratio.

Component (B) suitably comprises all latent curing agents that correspond to the initial definition and are known to one skilled in the art of single-component epoxy resins, e.g. dicyan diamide, guanidine derivatives, triazine derivatives, guanamine derivatives, aliphatic amines, cycloaliphatic amines, aromatic amines, polyamidoamines and imidazoles. Suitable latent curing agents also comprise all polymeric nitrogen-containing compounds, provided that they correspond to the above definition and allow an addition reaction. Adducts of epoxy resins and various amines are examples of the prior art. Mixtures of various latent curing agents are also provided to vary the speed of the curing agent or adjust the melting point according to the requirements.

In the embodiment of the compositions according to the present invention, latent curing agents with a melting point of less than 150° C., in particular latent curing agents with a melting point of less than 110° C. are preferred.

The proportion of the curing agent contained in the composition depends on the equivalents of the curing agents and (iso)cyanates used, with the curing agent used either in equal equivalents or in excess. The latent curing agents are available from the manufacturers with various particle sizes. Especially preferred are curing agents having a particle size of less than 10 μm.

Surprisingly, it was found that the latent curing agents used in epoxy resins have an excellent suitability for the manufacture of very fast-curing single-component polyurea adhesives, overcoming the slow curing disadvantage of single-component polyurethane adhesives. In addition, no cleavage products are released. Moreover, moisture is no longer necessary for curing. As compared to the known single-component isocyanate compositions and the single-component epoxy resins provided with latent curing agents these new compositions are much faster and provide a more user-friendly storage stability.

The compositions according to the present invention are characterized by the following advantages:

The compositions have an extremely high curing speed. A composition is considered as cured if the residual enthalpy determined by a DSC measurement (differential scanning calorimetry) is less than 5% of the total enthalpy. At 150° C. curing times of less than 30 seconds are possible; in preferred embodiments of the compositions of the present invention curing times of less than 15 seconds may be realized. At 120° C. curing times are within 60 seconds, in preferred embodiments of the compositions of the present invention curing times are within 30 seconds. Even at 80° C. curing times of less than 10 minutes are possible.

The above-mentioned curing times relate to curing in convection ovens. By using alternative curing methods such as IR radiators or thermode curing (thermocompression) curing times may again be reduced significantly. Curing by means of thermocompression is of particular interest: two heated thermodes are pressed against the part from above and below. Thus, heating times for the part are significantly reduced by this direct contact. This method is also used whenever as many parts as possible are to be cured within a very short period of time, for example when bonding flip chips on the respective substrate. Using the prior art epoxy resin systems curing times of 8 seconds at temperatures of more than 180° C. had to be used to achieve a complete curing. However, these high temperatures are already detrimental to many substrates. In addition, with curing times of more than 5 seconds curing becomes the speed-determining step for the whole facility. Using the compositions according to the present invention curing times of 5 seconds at 150° C. may be obtained in these facilities. When subtracting the short heating-up time of the parts of 1 to 2 seconds, the actual curing takes only 3-4 seconds.

Despite this extraordinary reaction speed the compositions exhibit an excellent storage stability or processing time of at least 2 weeks at room temperature or preferably at least 3 months at 8° C. Storage stabilities of 4 to 6 weeks at room temperature (20° C. to 25° C.) or 6 months at 4° C. to 8° C. are possible according to the present invention; even a storage temperature of 40° C. for 48 hours is possible. Compositions that at most double their viscosity in the given temperature range during the storage period are considered as storage stable.

According to the present invention, epoxy resins may be used as component (C). Since the curing agents mentioned as component (B) were initially used for epoxy resins, it is possible to combine two different resin systems, (iso)cyanates and epoxides, in one composition by means of the curing agents. Therefore, the properties of the compositions according to the present invention may be varied almost at random with regard to strength, adhesion, absorption of water and media resistance. Surprisingly, the curing speed is still determined by the reaction of the (iso)cyanates with the curing agents; thus, the reaction of the epoxy resins with the curing agents is significantly accelerated.

The epoxy resins may be aliphatic, cycloaliphatic or aromatic epoxy resins. Aliphatic epoxy resins contain components carrying both an aliphatic group and at least 2 epoxy resin groups. Examples of aliphatic epoxy resins may be butanediol diglycidylether, hexanediol diglycidylether, dimethylpentanedioxide, butadienedioxide and diethylene glycoldiglycidylether.

Cycloaliphatic epoxy resins are well known in the prior art and contain substances carrying both a cycloaliphatic group and at least 2 oxirane rings. Exemplary representatives are 3-cyclohexenylmethyl-3-cyclohexylcarboxylatediepoxide, 3,4-epoxycyclohexylalkyl-3',4'-epoxycyclohexanecarboxylate, 3,4-epoxy-6-methylcyclohexylmethyl-3',4'-epoxy-6-methylcyclohexanecarboxylate, vinylcyclohexanedioxide, bis(3,4-epoxycyclohexylmethyl)adipate, dicyclopentadienedioxide and 1,2-epoxy-6-(2,3-epoxypropoxy)hexahydro-4,7-methaneindane. 3,4-epoxycyclohexylmethyl-3',4'-epoxycylohexylcarboxylate is preferably used.

Aromatic epoxy resins may also be used. Examples are bisphenol-A epoxy resins, bisphenol-F epoxy resins, phenol novolak epoxy resins, cresol novolak epoxy resins, biphenyl epoxy resins, biphenol epoxy resins, 4,4'-biphenyl epoxy resins, divinylbenzenedioxide and 2-glycidylphenylglycidylether. Polyfunctional epoxy resins of all three resin groups, viscoplastic epoxy resins and mixtures of various resins may also be used.

As modifiers (component (D)) fillers such as quartz powder, silicates, glass powder, teflon powder, ceramic powder, metal powder as well as colorants and pigments such as soots, metal oxides or organic colorants and pigments may be used. Stabilizing agents may be used to increase the storage stability (e.g. slightly acidic compounds such as toluenesulfonylisocyanate) and protect the cured composition from decomposition by heat or UV radiation (e.g. sterically hindered phenols or amines). Moisture-binding agents are also important modifiers to increase the storage stability and avoid the formation of carbon dioxide. Suitable accelerators are imidazoles or urea derivatives such as monuron or diuron, but also accelerators known to one skilled in the art of isocyanates, for example organo-tin compounds. The flow agents, wetting agents, diluents, thickening agents and thixotropifying agents known to one skilled in the art may be used to adjust the flow behavior. Combinations with each other or with the other modifiers according to the application requirements are possible.

The compositions according to the present invention exhibit an excellent suitability as adhesives, casting compositions and for the sealing or coating of substrates. The compositions are particularly suitable for production processes in which high numbers of parts have to be produced within a short period of time. This applies in particular to electronic parts, for example to the bonding of so-called flip chips on substrates as used in the smart cards and smart labels field.

Thus, a subject of the present invention also is the use of the compositions according to the present invention for bonding, casting, sealing and coating of substrates, preferably exhibiting the additional features of claims 10 to 12.

The compositions described are characterized by a very high storage stability of, for example, several months at a temperature of 4° C. to 8° C. or of several weeks at room temperature. At the same time, the compositions according to the present invention exhibit low curing temperatures and short curing times, for example 15 seconds at 150° C., or 5 seconds at 150° C. when using thermocompression. As compared to the known compositions of the prior art the difference between storage temperature and curing temperature could be reduced. This facilitates the use of the compositions of the present invention in technical processes in which a low-temperature storage of the compositions is undesirable, but short curing times and low curing temperatures are required. According to the present invention, both the energy consumption and the time required for the joining process are more favorable.

The invention will be explained by means of the following examples, which are not considered as limiting, in conjunction with the drawings.

FIG. 1 is a DSC (differential scanning calorimetry) graph showing the turnover of the epoxy/polyamine reaction of a comparative example (example 1) depending on the curing temperature;

FIG. 2 is a DSC graph showing the turnover of the polyisocyanate/polyamine reaction of example 2 (according to the present invention) depending on the curing temperature;

FIG. 3 represents two graphs showing the changes in viscosity of the comparative composition (right-hand graph) and the composition of the present invention (left-hand graph), each depending on the curing time at a constant temperature.

EXAMPLE 1 (COMPARATIVE EXAMPLE)

A prior art composition consisting of an epoxy resin and a latent curing agent is deemed to form a comparative example. It is composed of:
- 67% of a mixture of bisphenol-A and bisphenol-F epoxy resins (EPR166 available from Bakelite),
- 27% of a latent amine curing agent (Ancamine 2014AS available from Air Products),
- 3.5% of an accelerator (dicyan diamide Dyhard SF 100 available from Degussa) and
- 2.5% of a thixotropifying agent (Cab-O-Sil M5 available from Cabot).

The following properties of the examples are determined:
1. Curing Peak

A DSC822 type DSC device available from Mettler-Toledo (DSC=differential scanning calorimetry) is used to measure the reaction peak of the comparative composition. As can be seen from the DSC graph shown in FIG. 1, said peak is located at about 125° C.

2. Curing Speed

A rheometer obtained by Bohlin Instruments (device: Gemini) is used to determine the curing speed in the oscillation mode at a constant temperature. During curing the viscosity is significantly increased. A composition is considered as cured, if the viscosity no longer changes (plateau of the graph, FIG. 3, right-hand graph). At 150° C. the comparative example is cured within 60 seconds, at 120° C. within 8 minutes and at 80° C. within 4 hours.

3. Storage Stability or Processing Time

A rheometer is used to determine the viscosity of storage samples at regular intervals. The composition is considered as processible or storage stable until its viscosity has doubled. Table 1 sets forth a list of storage stabilities or processing times.

EXAMPLE 2

The composition of the present invention comprises the following components:
- 73.5% of a MDI-based polyisocyanate (Desmodur VL R20, Bayer),
- 24.5% of a latent amine curing agent (Ancamine 2014AS, Air Products),
- 1.5% of a thixotropifying agent (Cab-O-Sil M5, Cabot) and
- 0.5% of an adhesion promoter (Dynasilan Glymo, Degussa).

The DSC graph (FIG. 2) of this composition shows a temperature of the reaction peak of 74° C., which is approx. 50° C. lower than in the comparative example. This lower reaction temperature clearly results in a substantially higher reaction speed than in the comparative example. The rheometer graphs of FIG. 3 show a curing time of approx. 60 seconds at 150° C. for the comparative example (right-hand graph) and a curing time of only 10 seconds for the composition of the present invention (left-hand graph in FIG. 3). At 120 ° C. this composition of the present invention requires approx. 60 seconds for curing, at 80° C. 8 minutes. The storage stabilities or processing times are similar to those of the comparative example (Table 1).

EXAMPLE 3

The composition of the present invention comprises the following components:
- 65% of an IPDI-based polyisocyanate (Desmodur VL LS 2371, Bayer),
- 33% of a latent amine curing agent (Adeka Hardener EH4337, Asahi Denka),
- 1.5% of a thixotropifying agent (Cab-O-Sil M5, Cabot) and
- 0.5% of an adhesion promoter (Dynasilan Glymo, Degussa).

Table 1 summarizes the most important properties of this composition.

EXAMPLE 4

The composition of the present invention comprises the following components:
- 15% of a mixture of bisphenol-A and bisphenol-F epoxy resins (EPR166, Bakelite),
- 51% of a MDI-based polyisocyanate (Desmodur VL R20, Bayer),
- 30% of a latent amine curing agent (Ancamine 2014AS, Air Products),
- 1.5% of a thixotropifying agent (Cab-O-Sil M5, Cabot),
- 0.5% of an adhesion promoter (Dynasilan Glymo, Degussa) and
- 2% of a viscoplastic epoxy resin (Albipox 2000, Hanse Chemie).

This example shows that both isocyanate and epoxy resin react with the latent curing agent without causing the reaction speed to drop significantly. Table 1 summarizes the most important properties of this composition.

EXAMPLE 5

- 68% of a novolak cyanate ester (Primaset PT-90, Ciba Speciality Chemicals),
- 30% of a latent amine curing agent (Ancamine 2014AS, Air Products, modified aliphatic polyamine adduct),
- 1.5% of a thixotropifying agent (Cab-O-Sil M5, Cabot) and
- 0.5% of an adhesion promoter (Dynasilan Glymo, Degussa).

This example shows that cyanates can also react with the latent curing agent, with the reaction speed even slightly higher than with isocyanates. The storage stability is also slightly better than with isocyanates. Table 1 sets forth the most important properties of this system.

EXAMPLE 6

The composition of the present invention is made from the following components:
- 30% of a novolak cyanate ester (Primaset PT-90, Ciba Speciality Chemicals),
- 38% of a MDI-based polyisocyanate (Desmodur VL R20, Bayer),
- 30% of a latent amine curing agent (Ancamine 2014AS, Air Products, modified aliphatic polyamine adduct),
- 1.5% of a thixotropifying agent (Cab-O-Sil M5, Cabot) and
- 0.5% of an adhesion promoter (Dynasilan Glymo, Degussa).

This example shows that both isocyanates and cyanates react with the latent curing agent. Table 1 sets forth the most important properties of this system.

TABLE 1

| | Comparison of examples | | | | | |
|---|---|---|---|---|---|---|
| | Example 1 (compar.) | Example 2 | Example 3 | Example 4 | Example 5 | Example 6 |
| Peak temperature DSC | 125° C. | 74° C. | ND | ND | 69° C. | 72° C. |
| Curing time at 150° C. | 60 seconds | 10 seconds | 20 seconds | 20 seconds | 8 seconds | 10 seconds |

TABLE 1-continued

Comparison of examples

|  | Example 1 (compar.) | Example 2 | Example 3 | Example 4 | Example 5 | Example 6 |
|---|---|---|---|---|---|---|
| Curing time at 120° C. | 8 minutes | 60 seconds | ND | ND | 50 seconds | 55 seconds |
| Curing time at 80° C. | 4 hours | 8 minutes | ND | ND | 7 minutes | 8 minutes |
| Stability at 40° C. | 72 hours | 48 hours | 72 hours | 72 hours | 96 hours | 72 hours |
| Stability at room temperature | 2 weeks | 2 weeks | 4 weeks | 3 weeks | 6 weeks | 4 weeks |
| Stability at 8° C. | 6 months | 4 months | 6 months | 6 months | 6 months | 6 months |

The invention claimed is:

1. A thermosetting solvent-free single-component composition based on (iso)cyanates having a storage stability at room temperature of at least 2 weeks, comprising, in combination:
   (A) 5- 90 parts by weight of one or more of an at least difunctional (iso)cyanate component selected from the group consisting of an at least difunctional cyanate, an at least difunctional isocyanate and mixtures thereof,
   (B) 5- 50 parts by weight of a latent curing agent based on nitrogen compounds suitable for addition crosslinking,
   (C) 0- 50 parts by weight of an epoxy-containing compound, and
   (D) 0- 50 parts by weight of modifiers selected from at least one of the groups of fillers, colorants, pigments, stabilizing agents, moisture-binding agents, accelerators, flow agents, wetting agents, thixotropifying agents, diluents and polymeric thickening agents,
   with the sum of all parts by weight being 100, and
   wherein the latent curing agent is solid up to a temperature of at least 40° C. and remains inactive, but becomes active in a molten, liquid state at a temperature of from 80 to 160° C., and causes a polyaddition and crosslinking reaction between said latent curing agent and said at least difunctional (iso)cyanate component;
   wherein the latent curing agent comprises a polymeric nitrogen-containing compound formed from adducts of epoxy resins and amines, and
   wherein the at least difunctional (iso)cyanate component contains additional reactive (meth)acrylate groups capable of forming an interpenetrating (meth)acrylate network by crosslinking.

2. The composition of claim 1, characterized by a curing time of less than 30 seconds at 150° C. and less than 60 seconds at 120° C.

3. The composition of claim 2, characterized by a curing time of less than 15 seconds at 150° C. and of less than 30 seconds at 120° C.

4. The composition of claim 1, characterized by a storage stability of at least 3 months at 8° C.

5. The composition of claim 1, characterized in that the composition comprises an isocyanate consisting of prepolymers having terminal isocyanate groups with a molecular weight ranging from 400 to 10,000.

6. The composition of claim 1, characterized in that the composition comprises a cyanate consisting of prepolymers having terminal cyanate groups with a molecular weight ranging from 400 to 10,000.

7. The composition of claim 1, characterized in that the latent curing agent has a melting point of less than 150° C.

8. The composition of claim 1, characterized in that the latent curing agent has a particle size of less than 10 μm.

9. A process for the bonding, casting, sealing or coating of substrates characterized by using as a bonding, casting, sealing or coating material the composition of claim 1.

10. The process of claim 9 for bonding, casting, sealing or coating electronic parts.

11. The process of claim 9, wherein the composition is cured in a convection oven at a temperature of, at maximum, 150° C.

12. The process of claim 10 for the bonding of flip chips for smart cards and smart labels, wherein the composition is cured at a temperature of, at maximum, 150° C. by thermocompression.

13. The composition of claim 5, characterized in that the isocyanate consists of prepolymers having terminal isocyanate groups with a molecular weight ranging from 600 to 8,000.

14. The composition of claim 13, characterized in that the isocyanate consists of prepolymers having terminal isocyanate groups with a molecular weight ranging from 800 to 5,000.

15. The composition of claim 6, characterized in that the cyanate consists of prepolymers having terminal cyanate groups with a molecular weight ranging from 600 to 8,000.

16. The composition of claim 15, characterized in that the cyanate consists of prepolymers having terminal cyanate groups with a molecular weight ranging from 800 to 5,000.

17. The composition of claim 7, characterized in that the latent curing agent has a melting point of less than 110° C.

18. A thermosetting solvent-free single-component composition based on (iso) cyanates having a storage stability at room temperature of at least 2 weeks, consisting essentially of:
   (A) 30-90 parts by weight of one or more of an at least difunctional (iso) cyanate component selected from the group consisting of an at least difunctional cyanate, an at least difunctional isocyanate and mixtures thereof;
   (B) 5-50 parts by weight of a latent curing agent solid up to a temperature of at least 40° C. based on nitrogen compounds suitable for addition crosslinking;
   (C) 0-50 parts by weight of an epoxy-containing compound; and
   (D) 0-50 parts by weight of a modifier selected from the group consisting of at least one of a filler, a colorant, a pigment, a stabilizing agent, a moisture-binding agent, an accelerator, a flow agent, a wetting agent, a thixotropifying agent, a diluent and a polymeric thickening agent, wherein the sum of all parts by weight is 100,
and wherein the latent curing agent is solid up to a temperature of at least 40° C. and remains inactive, but becomes active in a molten, liquid state at a temperature of from 80 to 160° C., and causes a polyaddition and crosslinking reaction between said latent curing agent and said at least difunctional (iso)cyanate component;
wherein the latent curing agent comprises a polymeric nitrogen-containing compound formed from adducts of epoxy resins and amines; and
wherein the at least difunctional (iso)cyanate component contains additional reactive (meth)acrylate groups capable of forming an interpenetrating network by crosslinking.

19. The composition of claim 18, wherein the isocyante comprises a prepolymer having terminal isocyanate groups with a molecular weight raning from 400 to 10,000.

20. The composition of claim 19, wherein the isocyanate comprises a prepolymer having terminal isocyanate groups with a molecular weight ranging from 600 to 8,000.

21. The composition of claim 20, wherein the isocyanate comprises a prepolymer having terminal isocyanate groups with a molecular weight ranging from 800 to 5,000.

22. The composition of claim 18, wherein the latent curing agent has a melting point of less than 110° C.

23. The composition of claim 1, wherein the latent curing agent comprises said polymeric nitrogen-containing compound formed from adducts of epoxy resins and amines, and at least one of a compound selected from the group consisting of dicyan diamide, a guanidine derivative, a triazine derivative, a guanamine derivative, an aliphatic amine, a cycloaliphatic amine, an aromatic amine, a polyamidoamine and an imidazole.

* * * * *

UNITED STATES PATENT AND TRADEMARK OFFICE
CERTIFICATE OF CORRECTION

| | | |
|---|---|---|
| PATENT NO. | : 8,480,845 B2 | Page 1 of 1 |
| APPLICATION NO. | : 11/994113 | |
| DATED | : July 9, 2013 | |
| INVENTOR(S) | : Stumbeck et al. | |

It is certified that error appears in the above-identified patent and that said Letters Patent is hereby corrected as shown below:

In the Claims

Claim 1, Col. 9, line 45, "amines." should be --amines;--.

Signed and Sealed this
Fourteenth Day of October, 2014

Michelle K. Lee
*Deputy Director of the United States Patent and Trademark Office*